(12) United States Patent
Edler

(10) Patent No.: US 6,877,781 B2
(45) Date of Patent: Apr. 12, 2005

(54) CORRUGATED TUBE FITTING

(75) Inventor: David Edler, Waterville, PA (US)

(73) Assignee: Highlands Corporation, Wilmington, DE (US)

( * ) Notice: Subject to any disclaimer, the term of this patent is extended or adjusted under 35 U.S.C. 154(b) by 0 days.

(21) Appl. No.: 10/632,457

(22) Filed: Jul. 31, 2003

(65) Prior Publication Data

US 2005/0023832 A1 Feb. 3, 2005

(51) Int. Cl.[7] ............................................. F16L 35/00
(52) U.S. Cl. ..................... 285/903; 285/354; 285/353; 285/322; 285/323; 285/382.7
(58) Field of Search ................................. 285/322, 323, 285/334.5, 382.7, 353, 354, 903

(56) References Cited

U.S. PATENT DOCUMENTS

| | | | | |
|---|---|---|---|---|
| 2,363,586 A | * | 11/1944 | Guarnaschelli | 285/222.5 |
| 3,008,738 A | * | 11/1961 | Longfellow | 285/329 |
| 3,291,895 A | * | 12/1966 | Dyke | 174/88 C |
| 4,437,691 A | * | 3/1984 | Laney | 285/353 |
| 4,630,850 A | * | 12/1986 | Saka | 285/322 |
| 4,674,775 A | * | 6/1987 | Tajima et al. | 285/330 |
| 4,801,158 A | * | 1/1989 | Gomi | 285/52 |
| 5,441,312 A | | 8/1995 | Fujiyoshi et al. | |
| 5,799,989 A | | 9/1998 | Albino | |
| 6,019,399 A | | 2/2000 | Sweeney | |
| 6,036,237 A | | 3/2000 | Sweeney | |
| 6,099,046 A | * | 8/2000 | Oh | 285/354 |
| 6,102,445 A | * | 8/2000 | Thomas | 285/139.1 |
| 6,173,995 B1 | * | 1/2001 | Mau | 285/55 |
| 6,276,728 B1 | * | 8/2001 | Treichel | 285/382.7 |
| 6,371,154 B1 | * | 4/2002 | Kesterman et al. | 137/315.01 |
| 6,435,567 B2 | * | 8/2002 | Kikumori et al. | 285/319 |
| 2003/0062722 A1 | * | 4/2003 | Linhart | 285/319 |

FOREIGN PATENT DOCUMENTS

JP          1-203791      *  8/1989    ................. 285/903

* cited by examiner

*Primary Examiner*—James M. Hewitt
(74) *Attorney, Agent, or Firm*—Duane Morris LLP

(57) ABSTRACT

A fitting for an end of a length of corrugated tubing has a split retainer that grips the tubing corrugations, and is engaged between a fitting body and a nut. Upon tightening the nut on the fitting body, the endmost corrugation is compressed between the retainer and a sealing seat on the fitting body arranged to provide a narrow metal-metal sealing junction and also a gasket seal. The fitting body has an inwardly tapered conical surface with a circular outer radius surrounded by an annular groove, thus forming a sealing edge, and the annular groove carries a gasket. The conical surface is dimensioned so that the sealing edge falls between the maximum and minimum diameters of the endmost corrugation. As the fitting is tightened, the endmost corrugation is collapsed between the sealing edge and the retainer, providing a metal/metal clamped sealing junction. The outer diameter part of the endmost corrugation is wrapped into a bead or torus that compresses the gasket, forming a metal/gasket additional seal.

11 Claims, 4 Drawing Sheets

CORRUGATED TUBE FITTING

BACKGROUND OF THE INVENTION

1. Field of the Invention

The invention concerns a fitting for sealed termination of a length of corrugated tubing, especially corrugated stainless steel tubing, for example as used for gaseous fuel lines.

The fitting includes a threaded fitting body and nut, cooperating with a retainer having one or more split rings that grip the corrugations adjacent to an end of the tubing. The tubing preferably is cut near a minimum diameter between corrugations and the retainer is placed axially behind the endmost corrugation. The nut and fitting body are placed on axially opposite sides of the retainer near the cut end. Tightening the nut on the fitting body forces the cut end of the tube axially against the fitting body, which has a dual sealing structure for providing a thin circular metal/metal sealing junction and an adjacent metal/gasket sealing junction.

More particularly, an inwardly tapering conical surface of the fitting body has a sharply formed outer edge. This sharp edge is surrounded by an annular space containing a gasket. During tightening, the cut end of the tubing deforms radially inwardly at the conical surface, causing the adjacent corrugation to fold and flatten over the sharp edge. A circular metal/metal junction with the tubing occurs at the nip between the retainer and the sharp edge surrounding the conical surface. The edge is placed to fall between the maximum and minimum radii of the corrugation of the tubing. The radially outer part of the collapsed corrugation forms a torus or bead that compresses the gasket, thereby also forming a metal/gasket seal.

2. Prior Art

Flexible corrugated tubing, especially corrugated stainless steel with optional plastic cladding, is an advantageous choice for natural gas supply lines and other applications that need to be gas- and/or water-tight as well as durably protected. The flexibility of corrugated tubing allows accommodates fixed and movable variations in the orientation and spacing of the connections of tube ends. This sort of tubing also is durable and resistant to damage from punctures and crushing. The flexibility minimize metal fatigue cracking due to repeated flexing. The corrugations can be engaged in the terminating fittings, providing strong mechanical connections that can bear substantial tension without being pulled apart.

However, couplings made at the ends of lengths of corrugated tubing are somewhat of a challenge. The corrugated tubing needs to be sealed and mechanically attached to associated terminal fittings to as to form a leak resistant flow path. The element that mates with the corrugated tube termination fitting could be a rigid supply pipe having a pipe thread fitting, for example, or a structure of an appliance, or perhaps an intermediate device such as a tee or a diameter changing nipple, valve, manifold, filter, etc.

The mechanical connection as well as the seal between the corrugated tubing and the terminal device or fitting should remain hermetically tight and mechanically load bearing over the life of the connection, which often equates to the life of the associated appliance or connection line. The tubing may be used to carry flammable gas to an appliance, and should survive adverse conditions without leakage. For example, the seal should remain gas-tight even in high temperature conditions as one might expect in a fire.

Various terminal fittings for corrugated tubing are known and are intended to provide a good mechanical connection and hermitic seal. The known fittings have a range of complexity. Some aspects that distinguish fitting structures over one another, in addition to mechanical attachment and sealing effectiveness, include the expense, the number and complexity of the parts, the steps required to assemble the fitting on a tube end, whether the parts are consumed or re-usable, etc.

Establishing a seal may involve axial or radial pressure exerted between the tubing and the fitting on an intervening gasket or O-ring. However, such pressure may be achieved in various ways operating axially or radially or both. Achieving secure mechanical contact against tension generally involves providing retaining structures such as split retainer rings that have one or more annular ridges extending radially inwardly into the valleys between corrugations so as to grip the tube against axial displacement. Advantageously, at least two parts are brought together during assembly of the fitting on the end of the tube, and the two parts can be arranged to engage the gripping structure for pushing the corrugated tubing against some sort of structure that is intended to provide a connection. The two parts respectively engage with the gripping structure and the structure against which the tubing is to be urged.

Examples of terminal fittings as described, generally for annularly corrugated tubing, are disclosed in U.S. Pat. No. 4,630,850—Saka; U.S. Pat. No. 5,441,312—Fujiyoshi et al.; U.S. Pat. No. 5,799,989—Albino; U.S. Pat. No. 6,019,399—Sweeney; U.S. Pat. No. 6,036,237—Sweeney: U.S. Pat. No. 6,173,995—Mau; and U.S. Pat. No. 6,276,728—Treichel. There are two general approaches to sealing represented. One technique is to provide a resiliently compressible gasket, and to arrange for a metal part to bear against the gasket. Another technique is to provide a metal-to-metal clamping mechanism involving the corrugated tubing, typically designed to crimp and flatten one or more corrugations between vise-like abutting surfaces that are brought axially together over a corrugation that is flattened.

It may be possible axially to seal the cut end of a corrugated tube by arranging for the cut end to bear against an annular abutting surface, possibly having a compressible gasket. However, the cut end of the tubing may not be cut exactly on a plane perpendicular to the axis of the tube. Different sorts of tools may be used to make the cut, which affect the nature of the cut (e.g., a hacksaw versus a pipe cutter). The cut edge may have irregularities from the cutting tool. Unless special provisions are available, the cut edge may occur at any phase position along the periodic corrugations, between the maximum and minimum diameter. As a result, the cut edge may be directed more or less axially versus radially for any give cut. These variations complicate the possibility of a direct endwise seal between the cut end and an abutting surface arranged substantially in a plane normal to the axis of the tube.

To reduce the possibility that unevenness at the cut end could result in a gap, it is conventional to clamp part of the endmost corrugation(s) between metal surfaces that are brought together when tightening the fitting. These surfaces flatten or reform one or more of the endmost corrugations so as to provide a flattened radial flange that is clamped between annular gripping surfaces on the fitting body and the retaining ring. sealing surfaces of greater width than the material thickness at a cut end. Flat annular surfaces in a plane normal to the longitudinal axis of the tubing are one possibility and can be formed using a split ring or other grasping structure the extends radially inwardly into a corrugation and is caused by some sort of collar to axially compress and clamp the adjacent corrugation. It is possible to use a radially flat annular clamping surface or conical clamping surfaces.

It is conventional to connect corrugated tubing to a fitting by flattening one or more corrugations of the tubing into flanges that are compressed between respective surfaces of a gripping or corrugation-engaging retainer and a complementary flat annular surface on the fitting body. Forming a flat flange reduces the effect of the cut end not being precisely formed. However a wide flat area of contact between a flange and a corresponding flat annulus may not provide a highly effective metal/metal seal, or a distinct edge to bear against a compressible gasket material.

To some extent, providing metal-to-metal sealing engagement is choice that is mutually exclusive with providing a metal-to-compressed gasket sealing. Each has different advantages and disadvantages. Metal-to-metal seals are strong but comprise material with comparatively little ability to recover their shape after deformation. Deformation that occurs when metal sealing structures are brought into contact is more or less permanent. In comparison, compressible materials such as resilient gasket material, can be deformed to complement an irregular shape. If a compressible material is later moved (for example when a fitting is taken apart and then reconnected), the compressible material can recover its original shape to an extent, and be compressed again under slightly different conditions to attain a new seal. Metal/metal seals are less likely to produce a new hermetic seal if disturbed.

It is possible to provide spring-like metal that has resilience, but it is generally not compressible in a way that facilitates sealing along a distinct sealing surface or edge. The metal material has advantages of structural strength, and disadvantages as to compliance for sealing. A more malleable metal is possible to conform under pressure, but is permanently deformed and lacks compliance under changing conditions.

It would be advantageous to maximize the benefits of metal/metal sealing strength while also providing sealing along a distinct edge as opposed to a wide surface. It would also be advantageous to make a seal compliant and re-usable even though the structures involved make substantial use of metal contact. It would further be advantageous to provide good metal-to-metal sealing in a structure that also is compliant to the extent that the fitting is insensitive to the precision or lack of precision along its cut end, is compliant and re-usable, and is unlikely in the long term to develop a leak.

SUMMARY OF THE INVENTION

It is an object of the invention to provide a fitting for use in various forms of corrugated tubing terminations and couplings, having improved mechanical strength and sealing performance compared to known fitting, without adding to complexity or expense.

It is another object to provide both metal/metal and gasket seals that form simply with tightening a fitting on a cut end of tubing.

Another object is to provide a fitting that can be retightened, reassembled and/or re-used, without undue loss of sealing effectiveness.

It is a further object to produce a metal/metal sealing junction at a narrow sealing line between relatively incompressible metal structures that clamp onto and deform the cut end of a length of corrugated tubing, in a way that provides sealing and mechanical attachment strength due to the shape to which the tubing is deformed.

Another object is to arrange a structure in which the narrow sealing line occurs at an axial or phase position along the periodic corrugations that is spaced from the maximum and minimum diameters, thereby sealing at a favorably placed point on the tube and also providing a bead associated with the maximum diameter part of the corrugation.

These and other objects are accomplished by a fitting for an end of a length of corrugated tubing with a split retainer that grips the tubing corrugations, and is engaged between a fitting body and a nut. Upon tightening the nut on the fitting body, the endmost corrugation is compressed between the retainer and a sealing seat on the fitting body arranged to provide a narrow metal-metal sealing junction and also a gasket seal. The fitting body has an inwardly tapered conical surface with a circular outer radius surrounded by an annular groove, thus forming a sealing edge, and the annular groove carries a gasket. The conical surface is dimensioned so that the sealing edge falls between the maximum and minimum diameters of the endmost corrugation. As the fitting is tightened, the endmost corrugation is collapsed between the sealing edge and the retainer, providing a metal/metal clamped sealing junction. The outer diameter part of the endmost corrugation is wrapped into a bead or torus that compresses the gasket, forming a metal/gasket additional seal.

BRIEF DESCRIPTION OF THE DRAWINGS

There are shown in the drawings certain examples and embodiments of the invention as presently preferred. It should be understood that the invention is not limited to the examples shown in the drawings but is capable of other embodiments in accordance with the scope of the invention claimed. In the drawings.

DETAILED DESCRIPTION OF PREFERRED EMBODIMENTS

Figure 1:
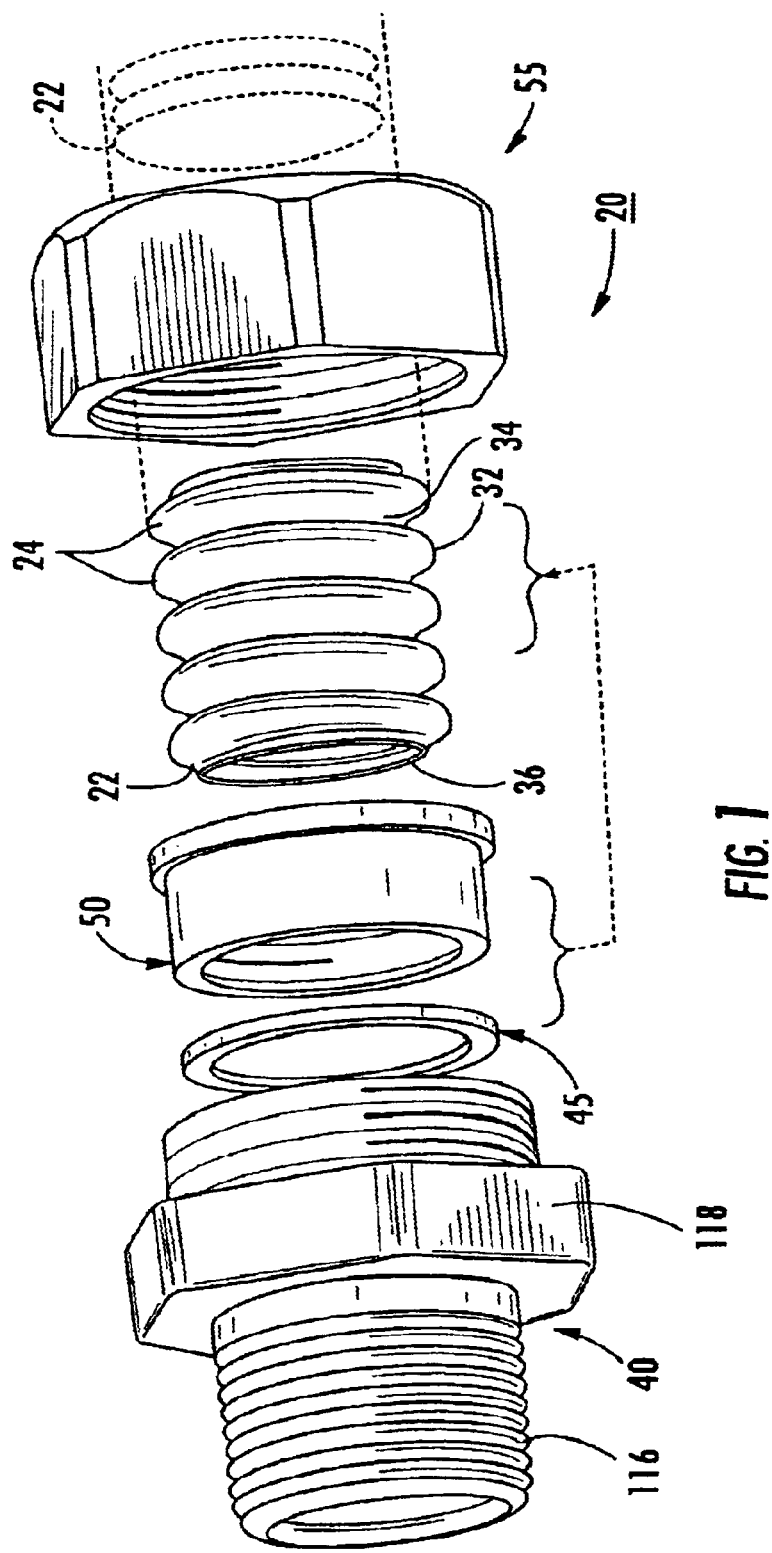
FIG. 1 is an exploded perspective view showing the parts of the inventive fitting, according to one embodiment.
Figure 2:
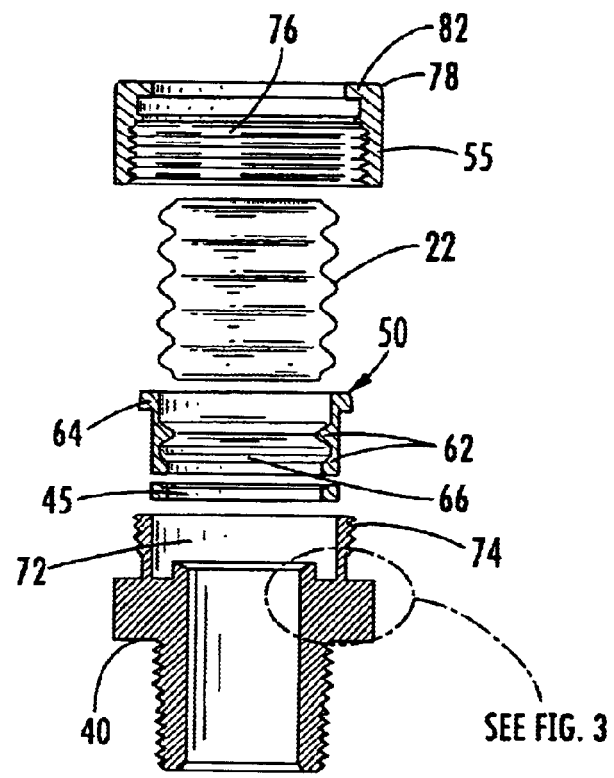
FIG. 2 is an exploded elevation view corresponding to FIG. 1, partly in section.

An inventive fitting 20 for an end of a length of tubing 22 such as corrugated stainless steel tubing is shown in FIGS. 1–6. FIG. 1 shows the respective parts in an exploded view along the end of a length of tubing of indefinite length, to be terminated by the fitting 20. The termination can be for any purpose that benefits from a sealed connection to the tubing, the illustrated example being a union fitting between the tubing and a pipe thread provided on a generally cylindrical fitting body having wrench flats, as typically used for making a union with a rigid pipe. The invention is equally applicable to sealed connections with other particular body elements such as couplings between lengths of tubing of the same or different structure, hookups with valves and regulators, reservoir and vessel walls, joints such as tees and elbows, manifolds, bulkheads, etc.

The tubing 22 has corrugations 24 or periodic variations ranging between a maximum diameter 32 and a minimum diameter 34, spaced generally regularly along a longitudinal (axial) extension of the tubing 22 up to a cut end 36. The tubing 22 preferably is cut from a longer length using a hand tool such as a hardened wheel tubing cutter or a hacksaw (not shown), for example, although a power tool such as a radial arm or pivoting chop saw can be used. Preferably the end is cut on a plane normal to the longitudinal axis of the tubing 22, and at an axial position at or near a minimum diameter 34 between corrugation ridges 24. It is generally stable and convenient to apply a cutting tool between corrugation ridges rather than on the ridges. Cutting near the point of minimum diameter is preferred according to the invention, which is arranged to seal the fitting 20 at a corrugation adjacent to the cut end 36, using particular structures provided in the fitting 20 that make a mechanical and hermetic seal as the fitting is tightened.

Referring to FIG. 1 from left to right, the fitting 20 comprises a fitting body 40, a gasket 45, a retainer 50 that engages the tubing 22 at a slight space from the cut end 36, and a nut 55 that threads onto the fitting body 40. The tubing 22 as shown in the drawings is bare corrugated tubing, but could be a plastic clad or coated tubing from which the covering material is stripped near the cut end 36. The same reference numbers are used throughout the drawings to refer to the same or corresponding structures.

The retainer 50 has at least one ridge 62 sized to extend inwardly to a radius between the maximum and minimum diameters 32, 34 of the tubing 22 and functions to grip the tubing axially above an endmost corrugation of the tubing away from the cut end, as shown in FIG. 1 by a broken line arrow. The retainer 50 as shown is externally shaped as a short tube part with an outwardly protruding flange 64 at one end. The retainer 50 could comprise one or several structures that have annular ridges facing inwardly to reside between the maximum diameter parts of successive corrugations. Possible variations include split rings or washers, resiliently mounted finger-like structures and the like. In the embodiment shown, particularly in the cross section view of FIG. 2, the retainer 50 has two axially spaced parallel ridges 62 facing radially inwardly to engage with corrugations 24 on the tubing 22.

The retainer 50 is circumferentially split by a slot 66 extending along at least a part of its axial length. This allows the retainer 50, having ridges 62 that normally extend radially inwardly to or near the minimum corrugation diameter 34, to be expanded as necessary to be passed longitudinally over the maximum diameter 32 of at least one corrugation ridge 24 back from the cut end 36. The retainer 50 could be resilient or malleable or simply separable into plural parts that are reassembled or placed in opposition to one another at the space of at least one corrugation back from the cut end 36.

In the embodiment shown, the retainer 50 has a flange part 64 that is circumferentially continuous and has an internal diameter greater than the maximum diameter 32 of the corrugations. The retainer has a ridged part that has a internal diameter with one or more ridges 62 that complement the corrugations, thus extending radially inwardly to less than the maximum diameter 32 of the corrugations. The ridged part is split by a longitudinal slot or cut 66 running through the ridges 62, enabling the retainer to be expanded and placed on the tubing to leave a corrugation at the cut end 36, extending beyond the retainer 50.

The nut 55 of the fitting 20 needs to be placed on the tubing 22 before the retainer 50, or the nut 55 could potentially be brought up toward the cut end 36 from the opposite end of the tubing. The nut is to be threaded onto the fitting body 40 so as to capture the retainer 50 and the tubing 22 therein. The fitting body 40 has a hollow cylindrical part 72 sized to admit the retainer 50 when on the tubing. The fitting body 40 has a threaded surface 74 to receive the nut 55 and the nut 55 has a thread complementary with the threaded surface of the body. The nut 55 has a cap part 78 configured to engage the retainer 50 for urging the retainer axially into the fitting body 40 with threaded advance of the nut relative to the body. In the embodiment shown, the nut has a radially inward flange 82 defining an axial opening with a diameter equal to or preferably just slightly greater than the maximum diameter 32 of the tubing, whereas the flange 64 on the retainer protrudes radially outwardly from the tubing.

According to an aspect of the invention, the fitting body 40 has an axially facing set of structures 85 that cooperate with the retainer 50 to form sealing connections with the corrugated tubing 22. More particularly, the cooperative action of the retainer 50 and the fitting body 40 position and clamp against an endmost corrugation at the cut end 36.

Figure 3:
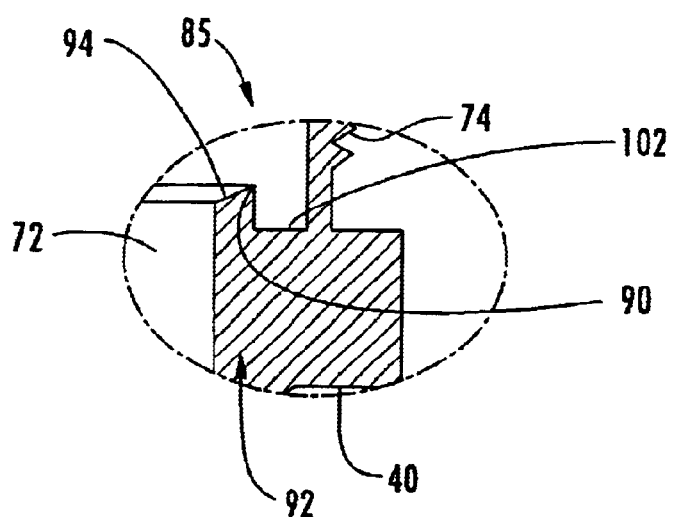
FIG. 3 is a detailed section view from the area identified by broken lines in FIG. 2.

The fitting body employs a point load structure to confine the metal clamping force applied to the endmost corrugation, namely clamping force between the retainer 50 (as urged by nut 55) and the fitting body 40 to a thin circular sealing line 90. The fitting body 40 can be formed of brass and preferably is machined to provide a sharp edge 90 at an axially facing interior base or abutment in the fitting body 40, encountered with axial advance of the cut end 36. An exemplary particular contour, shown in cross sectional detail in FIG. 3, is an enlargement of the portion of FIG. 2 identified with a broken line oval.

More particularly, the sharp edge 90 is formed as a triangular shape 92 in cross section as shown. The radially inner surface 94 that leads up to the edge 90 comprises an inwardly tapered conical surface. This conical surface 94 is surrounded by an annular groove 102, thereby forming the sharp edge 90 that is presented axially. The sharp edge 90 is disposed in alignment with the bottom edge 104 of the retainer 50. Thus the axial advance of retainer 50 with tightening of nut 55 produces a clamping action between the bottom 104 of retainer 50 and the sharp edge 90.

Due to the inwardly tapering conical surface 94, the free edge of the endmost corrugation 106 is deformed or diverted radially inwardly by axial pressure produced in tightening the nut 55 on the fitting body 40. The sharp edge 90 at the radial outer edge of the conical surface 94 also is positioned at a diameter that is between the maximum and minimum diameters 32, 34 of the corrugations 24, including the endmost corrugation 106. Tightening the nut 55 proceeds in succession to bring the endmost corrugation 106 up to the sharp sealing edge 90, to place the sealing edge 90 at a predetermined point on the sidewall portion of the endmost corrugation 106, namely between the maximum and minimum diameters 32, 34 of the corrugation, and to compress the endmost corrugation 106 downwardly against the sealing edge 106.

Figure 4:
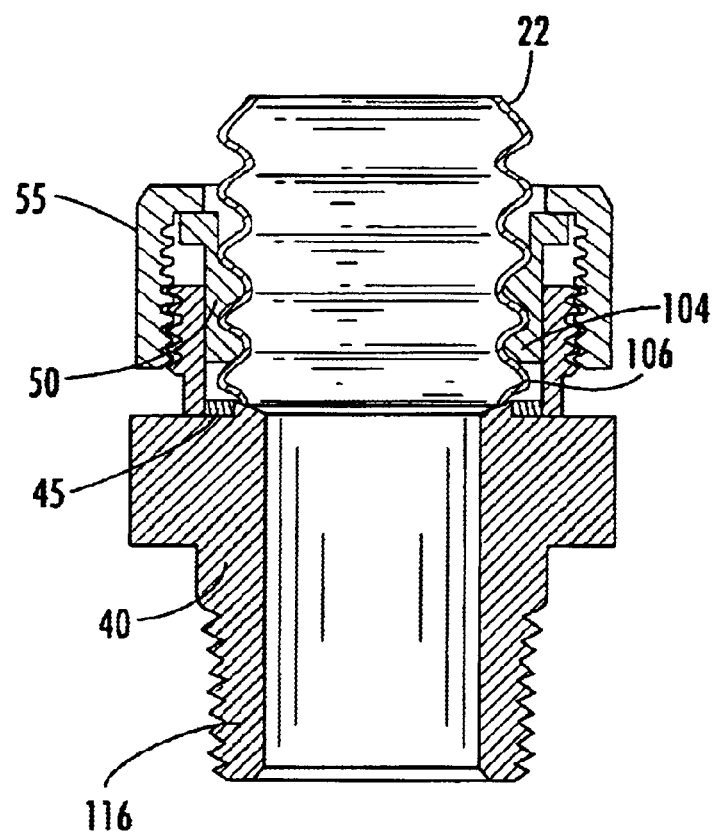
FIG. 4 is a section view illustrating an early stage in the assembly of the fitting.
Figure 5:
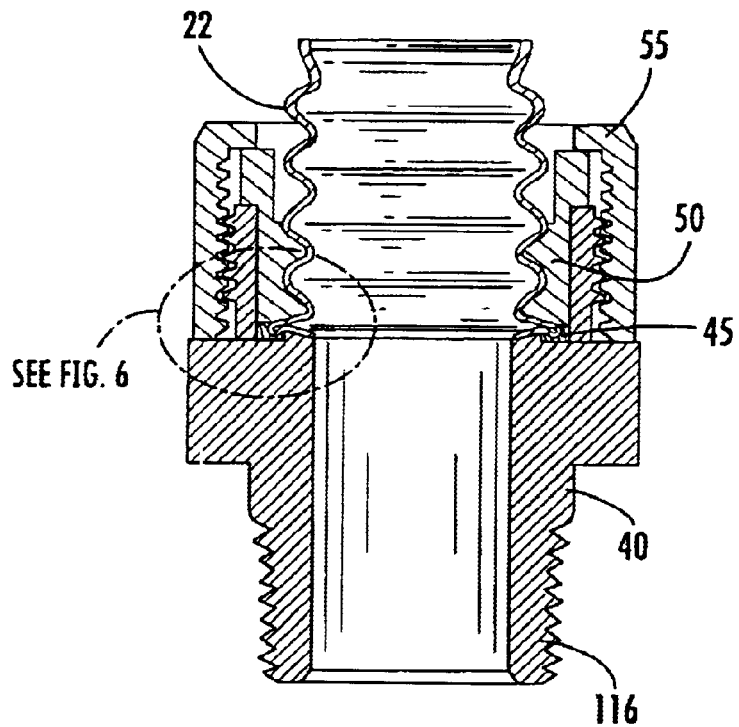
FIG. 5 is a section view illustrating a stage in assembly in which the fitting has been tightened to form a seal.
Figure 6:
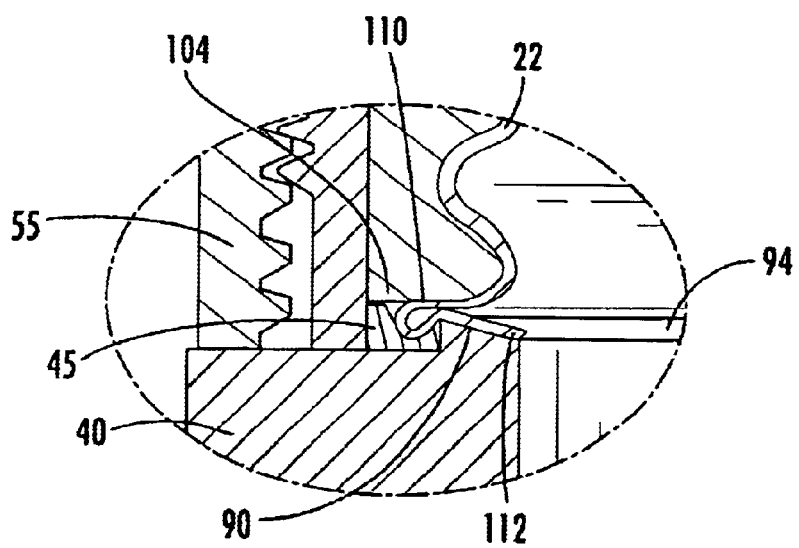
FIG. 6 is a detailed section view from the area identified in broken lines in FIG. 5, showing the completed seal.

The progression of tightening is demonstrated by comparing FIG. 4, in which the fitting body 40 and nut 55 are loosely assembled, and FIG. 5, in which the nut 55 has been tightened fully onto the fitting body 44 so as to eliminate any clearance between the sharp edge 90, the two side walls of the endmost corrugation 106, and the bottom surface 104 of the retainer 50. FIG. 6 is a detailed section from the area in the broken line oval in FIG. 5, and shows the effect of such tightening on the endmost corrugation 106. The endmost corrugation, which was disposed axially beyond the retainer 50 at the outset (FIG. 4), has been collapsed and turned over the sharp sealing edge 90 between the conical surface 94 and the annular space 102 around the conical surface.

By confining the sealing junction to a thin circular line of compression between the axial face of the retainer 104, which in this case is flat, and the sharp edge 90 surrounding the conical surface 94, a great deal of sealing pressure can be applied per unit of area, resulting in a secure mechanical clamping action and a good hermetic metal-to-metal seal between the brass of the fitting body 40 and the stainless steel (or other material) of the tubing 22.

Additionally, as apparent from FIG. 6, the flattened endmost corrugation 106 forms a toroid or circular bead 106 (a loop in cross section view) in the area of the folded corrugation that resides radially outside of the sharp edge 90. This toroid or loop 110 is generally smooth and well clear of irregularities associated with the cut end, and is apt for forming a seal with the compressible gasket 45 placed in the annular groove 102 outside of the sharp edge of the conical surface 94.

The sharp edge 90 of the triangular profile is placed so that the line of sealing with the tubing 22 occurs at a predetermined point along the corrugated shape, preferably at or near half way between the inner and outer diameter extremes 32, 34 of the corrugations). The precise point of contact can be varied so as to be somewhat nearer to one of the inner and outer diameter than then other, thus affecting the relative size of the loop 110 and the overlap of the cut edge on the conical surface. The point of contact can be made at the center or 50% of the distance between the diameter extremes 32, 34, or closer toward one than the other, for example between 30% and 70% or between 40% and 60% of the span between the inner and outer diameters, etc.

Providing a thin sealing line using sharp edge 90 creates a localized point load at around the circumference defining the seal. The endmost corrugation 106 folds over the sharp edge seat and is tightly clamped and sealed from leakage at the area of contact.

The extreme cut edge 112 of the endmost corrugation 106, and any burrs or irregularities, are kept clear of the sealing line at edge 90. This cut edge part 112 of the endmost corrugation overlaps the conical surface 94. With axial pressure from tightening of the nut, any burr on the cut end of the endmost corrugation is pushed inwardly and away from the sealing line. The burr is also isolated from any contact with gasket 45. The sealing line of edge 90 is at a relatively smooth medial position on the side of the endmost corrugation, and the loop or fold 110 at the outer diameter provides a smooth sealing structure for bearing against the compressible gasket 45.

In the embodiment shown, the compressible gasket 45 resides in a cylindrical annular groove 102 having parallel side walls. This annular groove could have other specific shapes, such as a sloping wall on the radially inner side (not shown), and still accept a functionally similar gasket to seal with the folded over loop at the outside diameter of the endmost corrugation. Nevertheless, the parallel side wall groove is useful as a secure structure to hold the gasket 45. The gasket preferably extends radially up to the same axial height or near the same axial height, as the sharp edge 90. The gasket 45 is resiliently deformed by contact with the loop part 110 of the collapsed endmost corrugation 106. In one embodiment, the gasket 45 is dimensioned at rest to be slightly thicker than the depth of the groove, for example protruding higher than the edge 90 by about 10 to 12% of the thickness of the gasket. The size of the loop part 110 compresses the gasket by about 7 to 17% of its rest thickness.

The gasket 45 can comprise a high temperature gasket or o-ring intended to provide a backup seal against leakage if the primary metal/metal seal is not perfect. The gasket can be set in a machined annular groove and preferably is set in place as a manufacturer's assembly process. Assembly at the factory is preferred because the gasket 45 advantageously has a slight interference fit to hold the gasket securely in place, and thus correct positioning of the gasket may be somewhat difficult to ensure if assembled in the field.

The preferred retainer 50 comprises a non-deformable brass retainer material that has a slit 66 or broken circumference along at least part of the axial length. The retainer has at least one and preferably two or more inside ridges 62 to rest between the ridges of the associated corrugations 24. The retainer is placed to grasp the corrugated tubing at a point that leaves only the endmost corrugation 106 exposed.

The retainer 50 transfers the tightening torque applied to the nut 55 on its helical threads, into an axial directed force applied to force the endmost corrugation against the sealing structures in the fitting body. This downward force is ultimately concentrated at the thin metal/metal seal at the nip between the sharp edge and the retainer, and forms the toroid or folded loop 110 that is forced against the compressible high temperature gasket 45.

It is possible to achieve the subject metal/metal seal without also employing the compressible gasket 45. However a high temperature gasket is preferred for sealing by axial and radial pressure against the bead formed in the endmost corrugation in the area outside of the sharp edge.

In the embodiment shown, the fitting body has a second threaded surface bearing a pipe thread 116, and also has wrench receiving faces 118, similar to those on the nut 55, for assisting in tightening the fitting. This sort of union is intended as a nonlimiting example, and the fitting body can take other specific forms.

The invention has been described with respect to the fitting as an apparatus or as an apparatus in combination with corrugated tubing that is of the appropriate dimensions to fit and operate to form a seal as shown in the progression of views in FIGS. 4–6. The invention can also be considered a method for forming a tubing corrugation and/or seal. This method comprises providing or cutting the tubing, preferably at a longitudinal point spaced between maximum diameter points of adjacent corrugations, such as the radially narrow point or valley between adjacent corrugations. This tubing is engaged by a retainer having a ridge placed axially behind at least an endmost corrugation of the tubing. The retainer is then advanced for forcing the endmost corrugation axially against an inwardly conical surface having an edge surrounded by an annular groove, the edge being disposed between the maximum and minimum diameters, sufficiently for folding the endmost corrugation over the edge to provide a circular sealing junction between the retainer and the edge. As described, the method further comprises spacing the edge radially inwardly from the maximum diameter and forming a bead in the endmost corrugation radially outside the circular sealing junction, and also forming a supplemental seal with the bead by placing a gasket in the annular groove, the gasket preferably comprising a high temperature resilient sealing materials that is compressed by the bead.

The invention has among its advantages the provision of both a metal-to-metal and high temperature gasket or O-ring seal in one arrangement and in a manner wherein the two seals rely in part on one another's structures. The triangular profile of the seal leading to the edge produces a thin point of sealing contact at which high pressure can be concentrated. The conical surface leading up to the edge has the further benefit of diverting any burr on the cut end of the endmost corrugation away from the gasket, preventing damage during assembly.

The inventive fitting can be disassembled and reattached because the sealing structures are not generally damaged during assembly. The re-assembly steps can involve forming a new cut end on the tubing, so as to rely on a different endmost corrugation. Alternatively, the seal can be reused because the provision of both a metal/metal and a supplemental gasket seal reduce the potential for leakage without relying wholly on either form of seal.

The fitting is effective and not unduly expensive. Its components are small and compact, requiring less assembly time and producing a good seal at modest tightening torque.

The invention having been disclosed in connection with certain preferred arrangements, variations within the scope of the invention will now become apparent to persons skilled in the art. The invention is not intended to be limited only to the embodiments specifically described as examples, and accordingly, reference should be made to the appended claims to assess the scope of the invention in which exclusive rights are claimed.

What is claimed is:

1. A fitting for an end of a length of tubing having corrugations ranging between a maximum diameter and a minimum diameter, the fitting comprising:
    a retainer having at least one ridge sized to extend inwardly to a radius between said maximum and minimum diameters for gripping the tubing axially above an endmost corrugation of the tubing, wherein the retainer has a flat axially facing surface disposed above said endmost corrugation;
    a body having a hollow cylindrical part sized to admit the retainer, the body having at least one threaded surface;
    a nut having a thread complementary with the threaded surface of the body, the nut having a cap part configured to engage the retainer for urging the retainer axially into the body with threaded advance of the nut relative to the body;
    wherein the body has an inwardly tapered conical surface with a circular outer radius surrounded by an annular groove, thereby defining a sharp edge opposed to the axially facing surface of the retainer, wherein the sharp edge is disposed between said maximum and minimum diameters and a circular nip is formed between the sharp edge and the axially facing surface of the endmost corrugation, and tightened by advance of the nut on the body.

2. The fitting of claim 1, wherein the fitting body has a second threaded surface bearing a pipe thread.

3. The fitting of claim 1, wherein the ridge of the retainer is circumferentially split to enable engagement over the maximum diameter.

4. The fitting of claim 3, wherein the retainer comprises a plurality of ridges that are complementary with the corrugations of the tubing, and a flanged part that is positioned for engagement with a flanged part of the nut.

5. The fitting of claim 1, wherein the conical surface of the fitting and the annular groove form a triangular cross section with a radially sloped side and a longitudinal side forming a right triangle and a corner of the triangle forms said sharp edge.

6. The fitting of claim 1, wherein the edge is placed to fall between 40% and 60% of a radial distance between the maximum and minimum diameters.

7. The fitting of claim 1, wherein the edge is placed to fall substantially at a midpoint between the maximum and minimum diameters.

8. A fitting for an end of a length of tubing having corrugations ranging between a maximum diameter and a minimum diameter, the fitting comprising:
    a retainer having at least one ridge sized to extend inwardly to a radius between said maximum and minimum diameters for gripping the tubing axially above an endmost corrugation of the tubing, wherein the retainer has a flat axially facing surface disposed above said endmost corrugation;
    a body having a hollow cylindrical part sized to admit the retainer, the body having at least one threaded surface;
    a nut having a thread complementary with the threaded surface of the body, the nut having a can part configured to engage the retainer for urging the retainer axially into the body with threaded advance of the nut relative to the body;
    wherein the body has an inwardly tapered conical surface with a circular outer radius surrounded by an annular groove, thereby defining a sharp edge opposed to the axially facing surface of the retainer, wherein the sharp edge is disposed between said maximum and minimum diameters and a circular nip is formed between the sharp edge and the axially facing surface of the endmost corrugation, and tightened by advance of the nut on the body;
    a compressible gasket disposed in the annular groove;
    wherein the edge is configured to form the endmost corrugation into a rolled bead between the maximum diameter and the nip between the sharp edge and the axially facing surface of the retainer, and wherein the bead compresses the gasket downwardly in the annular groove surrounding the sharp edge.

9. The fitting of claim 8, wherein the gasket comprises a gasket material capable of withstanding high temperatures.

10. A method of terminating a length of corrugated tubing comprising the steps of:
    cutting the tubing at a longitudinal point spaced between maximum diameter points of adjacent corrugations, thereby forming an endmost corrugation;
    engaging the tubing in a retainer having a ridge placed axially behind the endmost corrugation of the tubing, the ridge having a surface facing axially toward a cut end of the tubing;
    forcing the endmost corrugation axially against an inwardly conical surface having an edge surrounded by an annular groove, the edge being disposed between the maximum and minimum diameters and oriented to oppose the axially facing surface of the ridge of the retainer behind the endmost corrugation so as to form a sharp circular nip, thereby folding the endmost corrugation over the edge to form a bead around the nip and a circular sealing junction between the retainer and the edge.

11. The method of claim 10, further comprising forming a supplemental seal with the bead by placing a gasket in the annular groove, the gasket being compressed by the bead.

* * * * *

UNITED STATES PATENT AND TRADEMARK OFFICE
CERTIFICATE OF CORRECTION

PATENT NO. : 6,877,781 B2
APPLICATION NO. : 10/632457
DATED : April 12, 2005
INVENTOR(S) : David Edler It is certified that error appears in the above-identified patent and that said Letters Patent is hereby corrected as shown below:

Col. 9, line 39, after "corrugation" insert -- and substantially perpendicular to a longitudinal axis of said fitting --.

Col. 10, line 18, after "corrugation" insert -- and substantially perpendicular to a longitudinal axis of said fitting --.

Col. 10, line 36, before "edge" insert -- sharp --.

Col. 10, line 4, before "edge" insert -- sharp --.

Col. 10, line 7, before "edge" insert -- sharp --.

Col. 10, line 52, after "tubing" insert -- the axially facing surface being substantially perpendicular to a longitudinal axis of the tubing --.

Signed and Sealed this

Twentieth Day of October, 2009

David J. Kappos
*Director of the United States Patent and Trademark Office*